(12) United States Patent
Ruiz (10) Patent No.: US 6,796,405 B2
(45) Date of Patent: *Sep. 28, 2004

(54) VENTILATED BRAKE ROTOR

(75) Inventor: Stephen John Ruiz, Redondo Beach, CA (US)

(73) Assignee: Stop Technologies LLC, Torrance, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/430,920

(22) Filed: Nov. 1, 1999

(65) Prior Publication Data

US 2001/0032758 A1 Oct. 25, 2001

(51) Int. Cl.$^7$ .............................................. F16D 55/02
(52) U.S. Cl. .................................. 188/71.6; 188/264 A
(58) Field of Search ..................... 188/218 XL, 264 A, 188/264 AA, 218 R (56) References Cited

U.S. PATENT DOCUMENTS

| | | | |
|---|---|---|---|
| 2,380,085 A | * | 7/1945 | Tack et al. .................. 188/218 |
| 3,314,509 A | * | 4/1967 | Pelikan ....................... 188/218 |
| 3,592,297 A | | 7/1971 | Leffert et al. |
| 3,612,231 A | | 10/1971 | Hauth et al. |
| 3,747,345 A | * | 7/1973 | Markowski .................. 60/261 |
| 3,955,650 A | | 5/1976 | Ellis |
| 4,083,435 A | | 4/1978 | Gallus et al. |
| 4,128,363 A | * | 12/1978 | Fujikake et al. ......... 416/236 A |
| 4,142,822 A | * | 3/1979 | Herbert et al. ................. 415/2 |
| 4,164,993 A | | 8/1979 | Kobelt |
| 4,379,501 A | | 4/1983 | Hagiwara et al. |
| 4,533,184 A | | 8/1985 | Muller et al. |
| 4,865,167 A | | 9/1989 | Giorgetti et al. |
| 5,107,966 A | | 4/1992 | Metzler et al. |
| 5,161,652 A | | 11/1992 | Suzuki |
| 5,284,230 A | * | 2/1994 | Takaki .................. 188/218 XL |
| 5,427,212 A | * | 6/1995 | Shimazu et al. ...... 188/218 XL |
| 5,474,160 A | | 12/1995 | Siegrist |
| 5,492,205 A | | 2/1996 | Zhang |
| 5,542,503 A | | 8/1996 | Dunn et al. |
| 5,544,726 A | | 8/1996 | Topouzian et al. |

(List continued on next page.)

FOREIGN PATENT DOCUMENTS

| | | | |
|---|---|---|---|
| DE | 3740311 | * | 6/1989 |
| DE | 43 23 782 A1 | | 7/1993 |
| GB | 2144186 | * | 2/1985 |
| JP | 5321959 | * | 12/1993 |
| JP | 5346127 | * | 12/1993 |
| JP | 633961 | * | 2/1994 |
| JP | 0874900 A | * | 3/1996 |

OTHER PUBLICATIONS

Michael D. Hudson and Roland L. Ruhl, "Ventilated Brake Rotor Air Flow Investigation," Overview of ABS/TCS and Brake Technology (SP–1229).

*Primary Examiner*—Pam Rodriguez
(74) *Attorney, Agent, or Firm*—Blakely Sokoloff Taylor & Zafman (57) ABSTRACT

A ventilated brake rotor having vents disposed between two discs. The vents are defined by an adjacent pair of vanes distributed around the first disc and disposed below the second disc. Each vane is defined by a camber. The camber, in turn, is parallel to a curve that is defined by two camber lines. The curve is tangent to the leading end of a first camber line and tangent to a trailing end of the second camber line. The first and the second camber lines intersect where the first camber line is defined from a point on the interior radius of one of the two discs that intersects a datum. Moreover, the first camber line extends at a throat angle from the datum.

20 Claims, 6 Drawing Sheets

U.S. PATENT DOCUMENTS

| | | |
|---|---|---|
| 5,651,430 A | 7/1997 | Rancourt et al. |
| 5,706,915 A * | 1/1998 | Shimazu et al. ........... 188/71.6 |
| 5,810,123 A | 9/1998 | Giorgetti et al. |
| 5,823,303 A | 10/1998 | Schwarz et al. |
| 5,873,435 A | 2/1999 | Siegrist |
| 5,878,848 A | 3/1999 | Zhang |
| 5,906,253 A | 5/1999 | Rancourt et al. |
| 5,931,268 A | 8/1999 | Kingston et al. |
| 5,954,165 A | 9/1999 | Kito et al. |
| 5,957,249 A | 9/1999 | Yamazaki et al. |
| 6,119,820 A * | 9/2000 | Steptoe et al. ............. 188/71.6 |

* cited by examiner

VENTILATED BRAKE ROTOR

BACKGROUND OF THE INVENTION

1. Field of the Invention

The invention relates to a ventilated brake rotor.

2. Background Information

To decelerate a vehicle in motion or to maintain control of the vehicle's speed on a downhill grade, the vehicle must dissipate energy. Most cars, trains, airplanes, elevators, and other machines employ friction brakes for this purpose. For each wheel of an automobile, conventional disc-type brakes include two opposing, moveable steel plates, each faced with a heat- and wear-resistant lining known as a brake pad. Between a pair of brake pads is a brake rotor that rotates as the axle of the automobile turns. The brake rotor provides two conversion surfaces, against which a pair of brake pads may be applied so as to slow a vehicle down or bring it to rest through controlled friction by variable application of force. The kinetic or potential energy absorbed by the controlled slippage is converted into heat by the controlled friction. The heat generated is transferred principally within the brake rotor.

The heat produced by the conversion of the kinetic or potential energy of a vehicle traveling at normal highway speeds is significant. Moreover, more than eighty percent of this heat is conducted into the brake rotor. Excessive temperature in the rotor has numerous adverse consequences, such as distortion of the rotor surfaces or a decrease in the frictional force between the brake pads and the brake rotor (known as fading). Therefore, a brake system design needs to promote cooling of the brake rotor.

One technique to promote cooling of the brake rotor is to increase the thickness of the brake rotor so as to increase heat capacity. However, in modern rotor designs, increasing heat capacity by increasing mass and therefore weight is undesirable with the common materials used such as aluminum or metal matrix composite and especially Grey cast iron. A more common technique to cool down the brake rotor is to employ a ventilated brake rotor.

A ventilated brake rotor includes two parallel annular discs or rings supported at a distance from one another by a series of vanes. These annular discs are radially defined by an internal surface located at a first radius from their center and an external surface located at a second radius from their center. The series of vanes defines flow passages or channels between each adjacent pair of vanes. These flow passages may be distributed between the annular discs so that, as the brake rotor turns about its axis, the vanes induce air flow from the internal surface of the brake rotor, through its interior, and out to the external surface of the brake rotor. The passing air draws heat from the brake rotor and expels it radially outward in the direction of rotor movement. This process transfers heat away from the brake rotor through convection and cools it down.

The field is full of ventilated brake rotor patents that claim to describe vane designs that define efficient flow paths for air cooling purposes. Examples include U.S. Pat. Nos. 5,878,848, 5,492,205, and 5,161,652. Contrary to the assertions made in these patent documents, they do not incorporate and often contradict modern turbo-machinery principles.

U.S. Pat. No. 5,878,848 is assigned to General Motors of Detroit, Mich. and is employed in the 1998 Chevrolet Corvette C-5 front brake rotor. U.S. Pat. No. 5,878,848 discloses a ventilated brake rotor that focuses on the included angle between the cord at the nose of a vane and the radial line drawn through that point. By employing a zero or low angle of attack, U.S. Pat. No. 5,878,848 hopes to minimize incident and viscous losses so as to maximize rotor cooling air flow and the cooling rate.

To achieve a low angle of attack, the vanes of U.S. Pat. No. 5,878,848 are defined about a curved line having a curvature that is defined from at least one point on the locus radius of the rotor. This results in each vane being perpendicular or nearly so to the annular disc cover inner diameter as represented by the tangential flow vector. However, a low angle of attack would be applicable only for high air flow rates and zero or low angular velocity or rotation velocity, such as would be the case if the incoming air stream were further pressurized by a supplemental blower or the vehicle were moving very slowly. Neither of these are practical solutions. Moreover, another problem with this vane design is that it leads to separation of the air flow at the leading edge of the vane, followed by reattachment of the flow downstream. This separation and reattachment results in an increase in the air flow losses and, therefore, a decrease in air flow. Moreover, the inlet appears to form flow separation bubbles and turbulence that reduce the actual opening size of the inlet and result in reduced airflow. The decrease of the air flow losses and reduced airflow decreases cooling of the rotor. When tested, the performance of an embodiment disclosed in U.S. Pat. No. 5,878,848 was inferior to an embodiment of U.S. Pat. No. 5,161,652.

U.S. Pat. No. 5,161,652 is assigned to Toyota of Tokyo, Japan and is employed in the 1998 Toyota Supra. U.S. Pat. No. 5,161,652 describes a ventilated brake rotor design that continuously accelerates the air flow through vanes having essentially parallel walls until the air flow is perpendicular or even countercurrent to the tangential air flow at the exit of the air flow passage. The problem with this is that the disclosed vanes produce flow separation on the trailing side of the vanes. U.S. Pat. No. 5,161,652 does, however, correctly identify the inlet attack angle range as between forty and fifty degrees.

Another document disclosing a ventilated brake rotor is U.S. Pat. No. 5,492,205. U.S. Pat. No. 5,492,205 is assigned to General Motors and was invented by the same inventor as U.S. Pat. No. 5,878,848. Disclosed within U.S. Pat. No. 5,492,205 is a process to determine the ideal number of vanes for a given diameter of disc. The disclosed process brings a hydraulic principle into the heat transfer and air flow field of ventilated brake rotors. The number of vanes is determined by calculating the number that would result in a square vent profile for maximum vent cross sectional area to minimum surface area. The problem is that U.S. Pat. No. 5,492,205 does not use methods such as thermal conductivity, fin or vane efficiency, and boundary layer analysis, including considerations of changes in direction, acceleration and diffusion.

U.S. Pat. No. 5,544,726 describes the need to consider, in low mass brake rotors, balanced heat conduction to minimize distortion. This concept was also disclosed in U.S. Pat. No. 4,865,167, but with respect to radially straight vane designs.

In a curved vane design, like in all the above patents except U.S. Pat. Nos. 5,492,205 and 4,865,167, there is a beneficial consequence that the curved vane design resists heat induced distortion. This is true for angle vane designs as well. In design of U.S. Pat. No. 5,544,726, the highest material cross section is at the lowest radial position, nearer to the center of the rotor in contrast to where the greatest amount of heat is generated and where the greatest heat conductive transfer rate is required, at the outside. U.S. Pat. No. 5,544,726 focuses on balanced heat conduction while ignoring the fact that convection by airflow is the controlling heat transfer mechanism in this system, especially if U.S. Pat. No. 5,544,726 is trying to minimize the conduction of heat into the surrounding assembly.

One problem with U.S. Pat. No. 5,544,726 is that the airflow is grossly restricted by the width of the vanes and resultant vent shape at the inlet. The airflow further is restricted by a secondary set of vanes. This secondary set of vanes will cause a flow blockage at the narrowest point of the vent passages during modest airflow velocities due to the large amounts of turbulence and separation bubbles formed in the wake trailing behind the secondary vane. U.S. Pat. No. 5,544,726 is not known to have been embodied in a production application to date.

It is known that the rate of heat transfer from a ventilated brake rotor is in a direct relationship to the velocity of the air in the vent by forced convection. See generally, Michael D. Hudson and Roland L. Ruhl, "Ventilated Brake Rotor Air Flow Investigation", SAE International Congress, Detroit, Mich., February 1997. However, none of the above inventions has sufficiently taken this into account. Thus, what is needed is an increase in the convection heat transfer rate between the brake rotor and the air. In particular, what is needed is an improvement in the air flow capacity of existing ventilated brake rotors.

SUMMARY OF THE INVENTION

A ventilated brake rotor having vents disposed between two discs. The vents are defined by an adjacent pair of vanes distributed around the first disc and disposed below the second disc. Each vane is defined by a camber. The camber, in turn, is parallel to a curve that is defined by two camber lines. The curve is tangent to the leading end of a first camber line and tangent to a trailing end of the second camber line. The first and the second camber lines intersect where the first camber line is defined from a point on the interior radius of one of the two discs that intersects a datum. Moreover, the first camber line extends at a throat angle from the datum.

DETAILED DESCRIPTION OF THE INVENTION

Figure 1A:
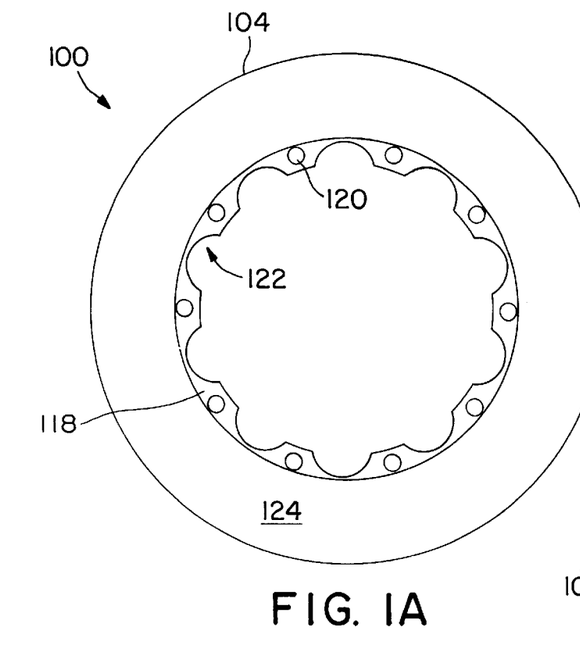
FIG. 1A is a top view of rotor 100.
Figure 1B:
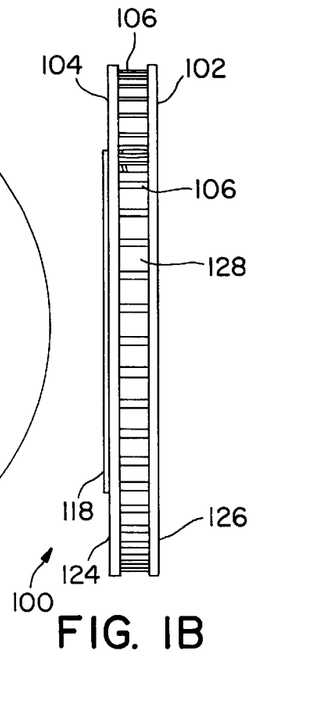
FIG. 1B is a side view of rotor 100.
Figure 2:
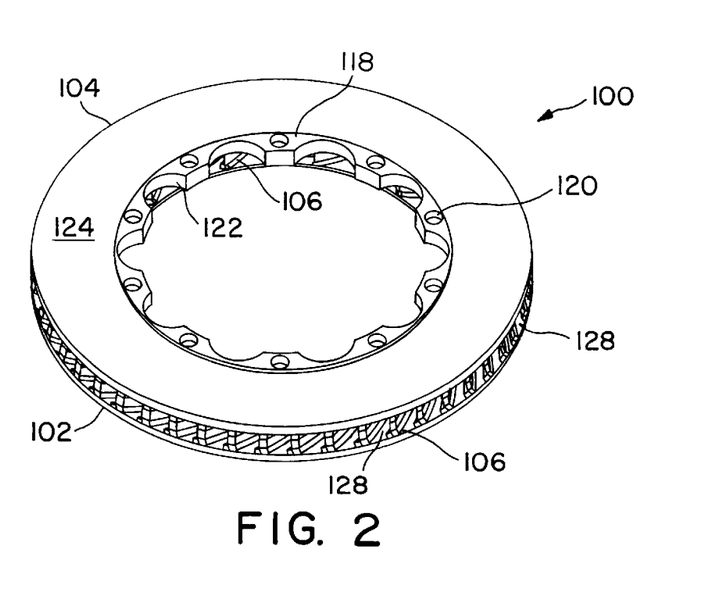
FIG. 2 is an isometric view of rotor 100.

FIG. 1A is a top view of rotor 100. FIG. 1B is a side view of rotor 100. FIG. 2 is an isometric view of rotor 100. For this invention, rotor 100 may be referred to as a ventilated brake rotor.

Included with rotor 100 may be inboard disc 102, outboard disc 104, and vanes 106. Inboard disc 102 and outboard disc 104 preferably are parallel annular discs supported at a distance from one another by vanes 106. Outboard disc 104 is what a user might see from a location external to (or "outboard" from) a vehicle when looking towards that vehicle.

Included on the interior diameter of outboard disc 104 may be hub mounting pad 118. Hub mounting pad 118 includes holes 120, about which material is removed so as to reduce the overall weight of rotor 100. The material removed is seen as crescent shaped cutouts 122 in FIG. 1A and FIG. 2. Since rotor 100 may be constructed from an iron, aluminum, or metal matrix composition through known methods such as casting, cutouts 122 are important for weight reduction.

Holes 120 may be used to connect rotor 100 to an annular disc (not shown) that includes an axle hole through which an axle of an automobile might extend. With the hub and axle installed, friction surfaces 124 and 126 of rotor 100 are maintained adjacent to the brake pads (not shown) of a brake caliper (not shown). Friction surface 124 and friction surface 126 are two heat dissipating surfaces, against which a pair of brake pads may be swept so as to slow a vehicle down or bring it to rest through controlled slippage. Hub mounting pad 118 preferably extends in axial direction 312 (see FIG. 3) beyond friction surface 124 so as to provide a datum surface from which to define the distance between the brake pads and friction surfaces. This may be seen in FIG. 1B.

As best seen in FIG. 2, vanes 106 define vents 128. Vents 128 preferably are distributed circumferentially between inboard disc 102 and outboard disc 104 so that, as brake rotor 100 turns about the axle of a vehicle, vanes 106 induce air flow from the radial interior of rotor 100, through vents 128, and out to the radial exterior of rotor 100. In other words, air flow preferably is induced by the shape of vanes 106 and the centrifugal acceleration of the air in vents 128 when rotor 100 is turning. The air passing within vents 128 draws heat from rotor 100 and expels it radially outward in the direction of the moving brake rotor. This process transfers heat away from rotor 100 through convection and cools it down.

Optimizing the Number of Vanes

It is known that the rate of heat transfer from a ventilated brake rotor is in a direct relationship to the velocity of the air in a vent by forced convection. To a certain degree, the velocity of this air in the vent is a function of the number of vanes employed for a given rotor embodiment.

To determine the number of vanes employed for a given rotor embodiment, an analysis of the heat transfer rate from the brake rotor vents may be performed. In this embodiment, the lowest speed used in this analysis is 37.5 miles per hour (mph). Thus, the length Reynolds number at the lowest speed for this analysis is $4 \times 10^4$. From page 200 of Rohsenow et al., "Heat, Mass and Momentum Transfer" (Prentice Hall, 1961), the Stanton number (St) is determined by equation (1):

$$St = h/\rho C_p W = 0.0025 \qquad (1)$$

where $\rho$ is the density of air, $C_p$ is the specific heat of air, and W is the average velocity of the air in the vent. Solving for the heat transfer coefficient (h), $$h = 5.18 \text{ Btu/hr}^\circ \text{ F.ft}^2 \qquad (2).$$

For a rotor made of cast iron, the thermal conductivity (k) is, $$k = 30 \text{ Btu/hr}^\circ \text{ F.ft} \qquad (3)$$

Solving for fin or vane efficiency $\eta_f$ by setting $\eta_f$ equal to a result of one or unity, $$\eta_f = \tan h(R_f b)/R_f b = \tan h(0.287)/0.287 = \sim 1.0 \tag{4}$$

The value of 0.287 indicates that $R_f b$ should be small in order to keep vane efficiency $\eta_f$ near unity.

The ratio of resistance to the thermal conductivity of the material compared to the resistance to thermal convection of the air $R_f$, can be expressed as, $$R_f b = (2h/kt)^{0.5} b \tag{5}$$

where t is average vane thickness and b is the vane height. Substituting for t and b, the total vane area is 1.15 ft². In this embodiment, the total area of the disc annulus is calculated to be, $$A_{2discs} = 2 \times 0.392 = 0.784 \text{ ft}^2 \tag{6}$$

Solving for the number of vanes iteratively for a primary vane angle around forty-five degrees yields a result of approximately forty-eight vanes. The total vane area for forty-eight vanes works out to be 1.12 ft². The vane efficiency $\eta_f$ for forty-eight vanes in this embodiment is 0.97. In other words, the use of forty-eight vanes in this embodiment yields a vane efficiency of near unity. Therefore, the vane area may be considered as prime area or, in other words, the vanes are essentially at the same temperature as the annular discs.

The total area for heat transfer in the vents is, $$A_{total} = 1.12 + 0.78 = 1.9 \text{ ft}^2 \tag{7}$$

The total heat transfer for the vents by themselves is given by the equation, $$q = hA(T_m - T_a) = 5.18 \times 1.9(T_m - T_a) \text{Btu/hr} \tag{8}$$

where $T_m$ is the temperature of the disc material and $T_a$ is the temperature of the surrounding air. The temperature difference between the material and the surrounding air may be represented by equation (9) below:

$$(T_m - T_a) = \Delta T \tag{9}$$

Substituting equation (9) into equation (8), we get, $$q/\Delta T = 984 \text{ Btu/hr per } 100^\circ \text{ F.} \tag{10}$$

which represents the temperature difference between the disc and the air at a vehicle speed of 37.5 mph. The value 984 Btu/hr per 100° F. is the heat transfer rate calculated for the 37.5 mph embodiment. Higher vehicle speeds will result in higher heat transfer, higher convection heat transfer, and higher $\Delta T$.

The above result illustrates the sensitivity of a ventilated disc brake system to rotation velocity and the slow transfer rate at low vehicle speeds. Since the use of forty-eight vanes in this embodiment yields a vane efficiency of near unity, the preferred number of vanes for this embodiment is forty-eight. If different parameters and measurements are employed for rotor 100, another number of vanes whether less than forty-eight or greater than forty-eight may be preferred. The number of vanes chosen may be a prime number for harmonic purposes.

Figure 3:
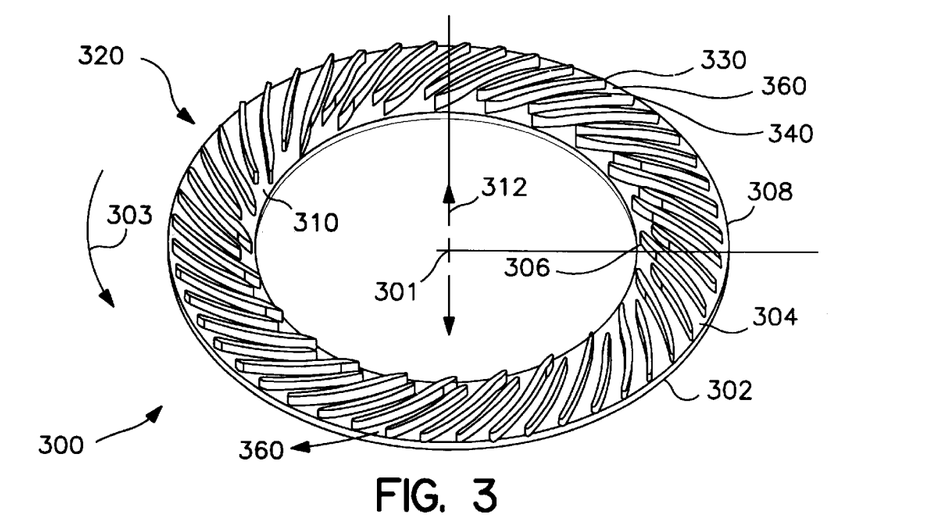
FIG. 3 illustrates an isometric view disc 300 employing the preferred forty-eight vanes.
Figure 4:
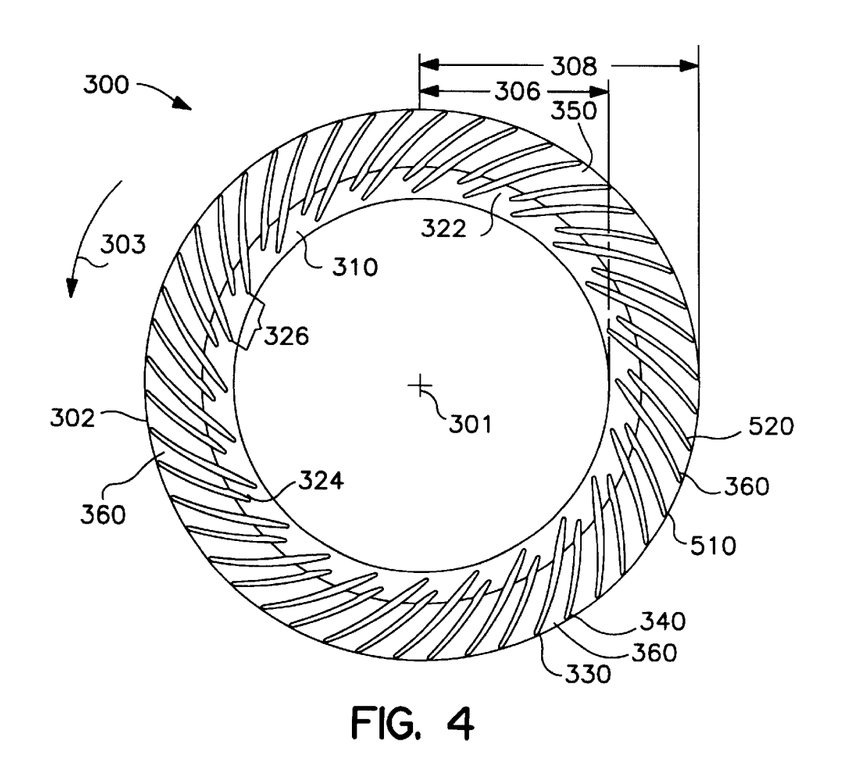
FIG. 4 illustrates a plan view of disc 300.

FIG. 3 illustrates an isometric view disc 300 employing the preferred forty-eight vanes. In one embodiment of the invention, disc 300 is outboard disc 104 of FIG. 2, where inboard disc 102 serves as an annular cover. In a preferred embodiment of the invention, disc 300 is inboard disc 102, where outboard disc 104 serves as an annular cover that has been removed from FIG. 2 so as to reveal disc 300 of FIG. 3. FIG. 4 illustrates a plan view of disc 300.

Included with disc 300 may be ring 302 and vane group 320. Ring 302 may include surface 304, ring interior 306, ring exterior 308, and tapered section 310. Vane group 320 may include a series of long vanes 330 interleaved with short vanes 340. Preferably, vane group 320 is disposed on ring 302 between ring interior 306 and ring exterior 308 in axial direction 312 so as to be perpendicular to surface 304 of ring 302.

When disposed on ring 302, an adjacent pair of short and long vanes define vent 360 whereas an adjacent pair of long and short vanes define vent 350. Moreover, when provided with an annular cover such as outboard disc 104 of FIG. 2, each vent 350 and 360 provides an air flow passage through rotor 100.

An air inlet throat of a given vent 350 or 360 may be viewed as the shortest distance between the two vanes that define that vent, when this distance is viewed in a direction that extends away from the center 301 of disc 300. As best seen in FIG. 4, disc 300 includes three air inlet throat areas. Vent 350, defined by short vane 340 and long vane 330 in direction of rotation 303, includes throat 322. Vent 360, defined by long vane 330 and short vane 340 in direction of rotation 303, includes throat 324. Throat 326, which inherently defines the largest of the three throat areas, is defined by two adjacent long vanes.

Air entering vents 350 and 360 must turn approximately ninety degrees into the entrance of the rotor intake. This sharp turn results in flow separation. To help account for this, an embodiment of the invention employs tapered section 310.

Tapered section 310 may extend from ring interior 306 towards surface 304 in an angle, an increasing angle, or an arc. In other words, for a given plane parallel with ring 302, the thickness of tapered section 310 at ring interior 306 is less than the thickness of ring 302 as measured at ring exterior 308. In this way, the contour of tapered section 310 cooperates with vane group 320 to smoothly accelerate the airflow into one of the three air inlet throats 322, 324, or 326. As the inlets face toward the direction of rotation 303 (i.e., the forward rotation direction for a vehicle), it is noted that rotor 300 is designed to increase airflow in the forward direction. In other words, rotor 300 is "unidirectional" in that vane group 320 is arranged directionally in the direction of forward rotation. Therefore, rotor 300 must be designed specifically for a left side or a right side of a vehicle, and the left or right side rotors must remain on that side in order to direct airflow for cooling. Outboard disc 104 may include a similarly tapered section when outboard disc 104 serves as an annular cover for vents 350 and vents 360. When assembled as shown in FIG. 2, ring 302, vane group 320, and outboard disc (annular cover) 104 present a series of vents 128, each having a rectangular cross section that varies from ring interior 306 to ring exterior 308.

As used in this patent, tapered section 310 need not be a physical structure. Tapered section 310 may refer to a radius that is measured from the center disc 300. Thus, features on disc 300 that are referenced from tapered section 310, may be referenced from a radius measurement only rather than a physical feature such as tapered section 310.

Optimizing Air Flow Passage

As noted above, it is known that the rate of heat transfer from a ventilated brake rotor is in a direct relationship to the velocity of the air in a vent by forced convection. To a certain degree, the velocity of this air in the vent is a function of the air flow passage employed for a given rotor embodiment.

To optimize the air flow passages, the invention works to induce the maximum airflow within vanes 106 over the expected operating speeds of rotor 100. For an automobile, the expected operating speeds of rotor 100 may range from twenty miles an hour to seventy miles an hour. For airplanes and high performance racecars, expected operating speeds of rotor 100 are much higher.

To induce the maximum airflow within vanes 106 over the expected operating speeds of rotor 100, an embodiment of the invention develops the vent forming surfaces of long vanes 330 and short vanes 340 about a curve that may be tangent to the leading and trailing ends of two adjoining camber lines. In another embodiment of the invention, long vanes 300 include a reflexed, third camber line at the vent air inlet so that a preimpeller surface may be employed for improved low speed operations.

A camber may be viewed as a slightly arched surface such as that seen in an airfoil. The camber is reflexed when it is bent or turned back on itself so that the slightly arched surface now may resemble the shape of the letter "S". Once developed, this S-shaped series of lines may be defined mathematically by a cubic polynomial. In this invention, the lines employed to develop the cambers are referred to as camber lines.

Figures 5, 6:
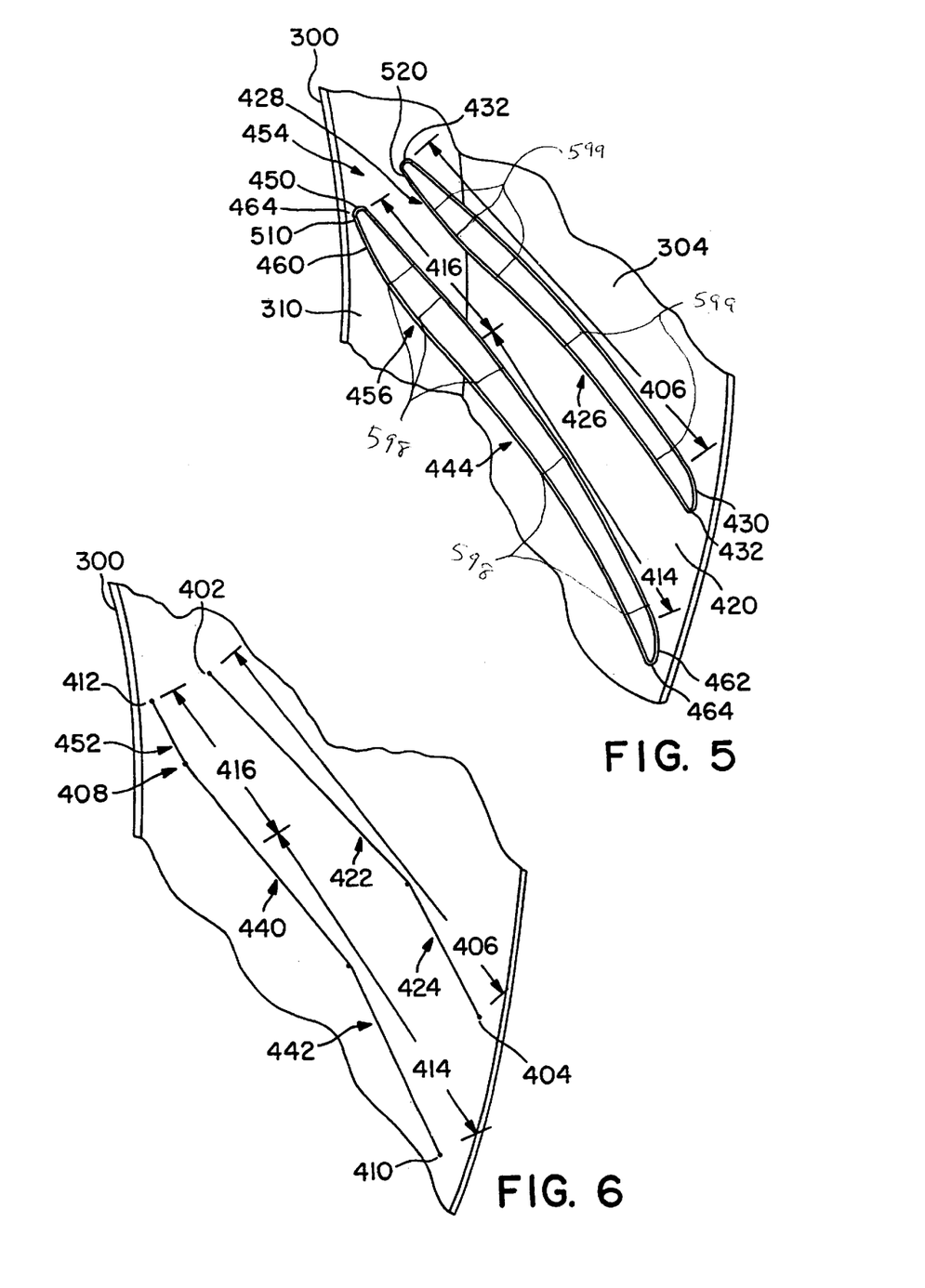
FIG. 5 is a detailed view of long vane 510 and short vane 520 of FIG. 4.
FIG. 6 is an exaggerated illustration of the camber lines used to develop the leading surface of long vane 510 and short vane 520 of FIG. 5.

FIG. 5 is a detailed view of long vane 510 and short vane 520 of FIG. 4. FIG. 6 is an exaggerated illustration of the camber lines used to develop the leading surface of long vane 510 and short vane 520 of FIG. 5. The camber lines of FIG. 6 are used to create the vanes of FIG. 5 and, thus, FIG. 4. The development of the camber lines will be discussed in connection with FIG. 7 through FIG. 9.

As seen in FIG. 5, leading surface 406 of short vane 520 sweeps rearward toward vent exit 420 along a convex path. Curved surface 406 preferably is developed parallel to a curve that is tangent to a point that is adjacent to leading end 402 of FIG. 6 and trailing end 404 of adjoining camber lines 422 and 424. Curved surface 426 of short vane 520 may be parallel to curved surface 406 at a given distance apart.

Included with short vane 520 may be transition piece 428 that accounts for air flow separation. Short vane 520 may also included a smoothed section at exit surface 430 and rounded corners 432. The smoothed section at exit surface 430 promotes a smooth exit flow of air and rounded corners 432 account for manufacturing limitations such as casting sharp corners in a metal disc 300. Fillets may also be added at the intersection of vane 520 and surfaces 304 and 310.

FIG. 5 also illustrates long vane 510. Similar to leading surface 406 of short vane 520, leading surface 414 of long vane 510 sweeps rearward toward vent exit 420 along a convex path. Curved surface 414 preferably is developed parallel to a curve that is tangent to a point that is adjacent to leading end 408 of FIG. 6 and trailing end 410 of adjoining camber lines 440 and 442. Curved surface 444 of long vane 510 may be parallel to curved surface 414 at a given distance apart.

As can be seen in FIG. 5, reference numeral 599 illustrates a plurality of portions of short vane 520 that are not equidistant from one another between curved surface 406 and curved surface 426. That is, length between curved surface 406 and curved surface 426 at various portions have a different length. Reference numeral 598 illustrates a plurality of portions of long vane 510 that are not equidistant from one another between curved surface 416 and curved surface 444. That is, length between curved surface 416 and curved surface 444 at various portions have a different length. One should note that while a fixed number of portions 599 and 598 are illustrated, more non-equidistant portions exist in the embodiments.

Recall that the speed of a brake rotor contributes to the volume of air flowing through the brake rotor. As the brake rotor slows down due to friction, the brake rotor heats up, but draws less air into its vents. Thus, it is important to promote a better air flow rate at low speeds so as to counter the temperature rise in the slowing brake rotor. To achieve this, an embodiment of the invention employs third camber line 452 in long vane 510 to form a preimpeller.

A preimpeller may be viewed as an artificial tipping of nose 450 of long vane 510 towards direction of rotation 303. At relatively slow speeds, such as 37.5 mph, the tangential velocity of the air at ring interior 306 of FIG. 3 predominates over the radial full velocity of the air at ring interior 306. By artificial tipping nose 450 of long vane 510 towards direction of rotation 303, a preimpeller is formed that honors the tangential velocity component of the air at ring interior 306 during relatively slow speeds. The preimpeller also resists air boundary layer separation along curved surface 414 during high speeds. For some discussion on the use of preimpellers, see Michael D. Hudson and Roland L. Ruhl, "Ventilated Brake Rotor Air Flow Investigation", SAE International Congress, Detroit, Mich., February 1997.

To form a preimpeller along the leading surface of long vane 510, reflexed camber line 452 of FIG. 6 is formed from leading end 412 at an angle that will intersect camber line 440. Curved surface 416 of long vane 510 sweeps frontward from concave surface 414 toward vent inlet 454 along a concave path. Curved surface 416 preferably is developed parallel to a curve that is tangent to a point that is adjacent to leading end 412 of camber line 452 in FIG. 6 and tangent to the convex curve formed between leading end 408 and trailing end 410 of adjoining camber lines 440 and 442. The two points of tangency will form a smooth transition between the convex curve of surface 414 and the concave curve of surface 416.

Included with long vane 520 may be transition piece 456 that is tangent to trailing edge curve 444 and straight line 460. Long vane 510 may also included a smoothed section at exit surface 462 and rounded corners 464. The smoothed section at exit surface 462 promotes a smooth exit flow of air and rounded corners 464 account for manufacturing limitations such as casting sharp corners in a metal disc 300. Straight line 460 is disposed between rounded corner 464 and transition piece 456 so as to be tangent to each feature. Fillets may also be added at the intersection of long vane 510 and surfaces 304 and 310.

As noted above, the surface perimeter of long vane 510 and short vane 520 are based on curves that are tangent to the camber lines shown in FIG. 6. In the preferred embodiment of the invention, camber lines 422 and 424 of short vane 520 are developed using a similar method employed to develop camber lines 440 and 442 of long vane 510. Thus, vent 350 of FIG. 4 is identical to vent 360 of FIG. 4 in this preferred embodiment. Moreover, the following discussion is relevant to short vane 520 as the discussion relates to camber lines 440 and 442 of long vane 510.

Developing camber lines 440, 442, and 452 for long vane 510 requires determining a throat angle, identified as $\beta_t$, an exit angle, identified as $\beta_e$, and an preimpeller angle, identified as $\beta_{i\omega}$.

Throat Angle ($\beta_t$)

Figure 7:
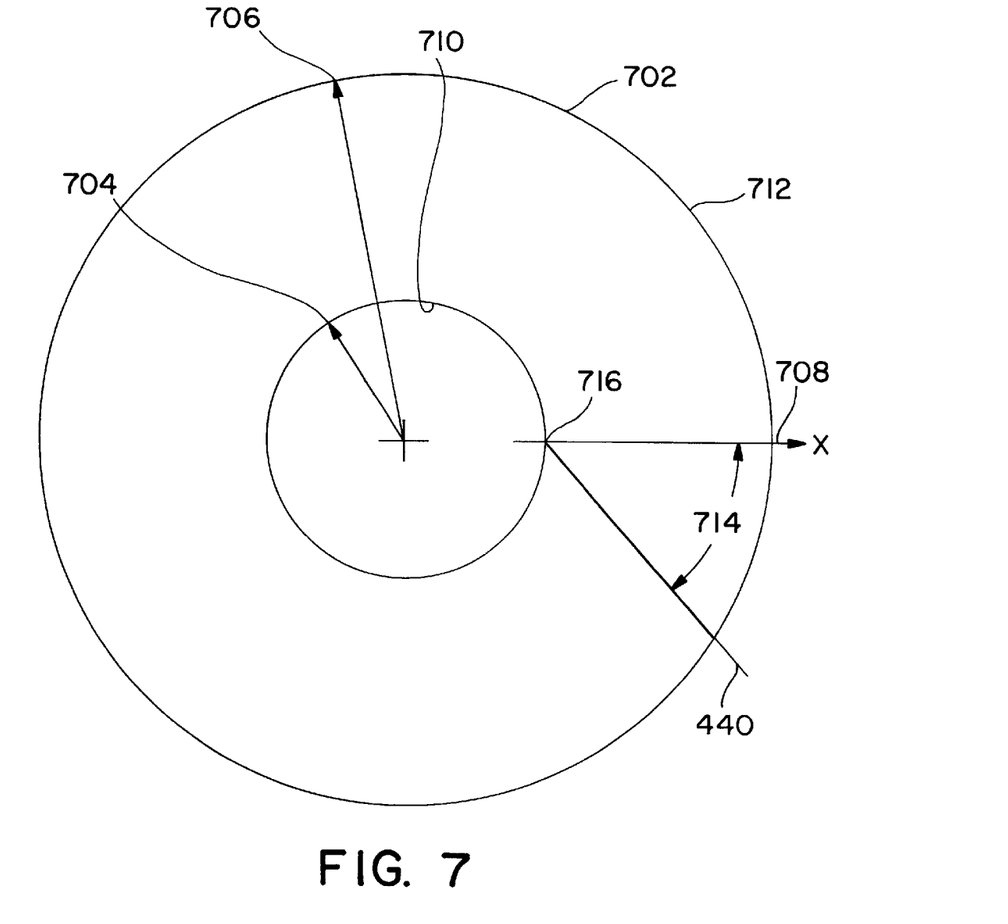
FIG. 7 illustrates the results of developing camber line 440 onto ring 702.

FIG. 7 illustrates the results of developing camber line 440 onto ring 702. Ring 702 is identified by inner radius 704, outer radius 706, and datum 708. Inner radius 704 defines ring interior 710 and outer radius 706 defines ring exterior 712. Datum 708 may be identified as an X-axis for ease of discussion. Camber line 440 is defined from a point that is adjacent to point 716, wherein point 716 is the intersection of datum 708 and ring interior 710. Practical casting issues may make it difficult to define Camber line 440 is defined from point 716. Camber line 440 further is defined by extending in an angular direction that measures throat angle 714 from datum 708. The following discussion establishes that throat angle 714 (or $\beta_t$) may range from 40.0 and 50.0 degrees, but preferably is 48.5 degrees.

The continuity equation states that whatever air flows into the rotor must flow out, since there is no accumulation of mass in the flow (or vent) passages. If vanes 510 and 520 had no thickness and there were no boundary layer growth due to blade surface friction, there would be no flow blockage. Here, the flow blockage would not have to be taken into account in applying the continuity equation. However, since each vane includes a thickness and the wall boundary layer grows in the flow direction, the flow blockage must be taken into account in applying the continuity equation.

In forming rotor 100, a rounded feature on ring interior 306 (FIG. 3) preferably is added to eliminate flow separation after the axial air flow begins to change direction to enter the vent. This is becoming a common practice in contemporary rotor design. Refer to Michael D. Hudson and Roland L. Ruhl, "Ventilated Brake Rotor Air Flow Investigation", SAE International Congress, Detroit, Mich., February 1997. Since there is no boundary layer blockage and there preferably is a round corner at ring interior 306 (FIG. 3) or inner radius 704 (FIG. 7), the blockage at inner radius 704 due to inboard disc 102 and outboard disc 104 of FIG. 2 is nearly zero.

After passing through throat 324 (FIG. 4) formed between long vane 330 and short vane 340, the air flow is gradually diffused to vent exit 420 (FIG. 5) from vent 360 (FIG. 4). To accomplish this diffusion, vent passage 360 is progressively enlarged so that the ratio of the exit area to the throat area is small enough to prevent separation or stall in vent passage 360.

The vanes initially may be swept back at vent exit 420 to an angle between forty and sixty degrees, but always in excess of throat angle 714 ($\beta_t$). The maximum efficiency is relatively the same from 40 to 60 degrees. Preferably, the vanes initially are swept back at vent exit 420 to around fifty degrees. Such a sweep back results in maximum impeller polytropic efficiency, D. G. Wilson, "The Design of High Efficiency Turbo-machinery and Gas Turbines" 340 (MIT Press, Cambridge, Mass., 1984).

One of Bernoulli's theorems states that, as the flow area increases downstream of the throat, the flow diffuses such that the flow velocity decreases and the pressure increases. The boundary layer can become turbulent downstream of the throat, growing rapidly into the frictionless center free stream and adding to the flow blockage.

The physical area ratio for diffusion is the comparison of the area of the vent at two positions perpendicular to the flow at that position. For this example, where $A_e$ is the area at the exit and $A_t$ is the area at the throat or narrowest position in the vent. The boundary layer condition at $A_t$ is laminar and the thickness of the boundary layer is considered negligible relative to the exit condition. This detail is used later. In an embodiment having vane exit angles at approximately fifty degrees and a diffuser length to vane throat height ratio of 10, the physical area ratio is, $$(A_e/A_t)_{physical}=1.67 \tag{11}$$

This physical area ratio for diffusion is permissible since stall or separation for the present embodiment does not occur until $(A_e/A_t)_{physical}$=2.30. See D. G. Wilson, "The Design of High Efficiency Turbo-machinery and Gas Turbines" 154 (MIT Press, Cambridge, Mass., 1984). The difference between 2.30 and 1.67 forms a margin that both allows for the effects of the heat transfer that will take place as the air moves through the vent passage and works to prevent stall or separation.

The best estimate, from flow observations of the boundary layer thickness at the vane exit corresponds to the thickness of one to two turbulent boundary layers at the vane exit if there were no pressure increase. Concerning the resulting angle for slope of camber line 440 at the throat ($\beta_t$), it makes no difference whether the exit boundary layer blockage is one or two zero pressure gradient layers thick.

The zero pressure gradient boundary layer growth is expressed as, $$\delta/x=0.037(\rho Wx/\mu)^{-0.2} \tag{12}$$

$$\delta^*/\delta=\tfrac{1}{8} \tag{13}$$

where $\rho$ is the density of air, $\mu$ is the viscosity of air, W is the average air velocity relative to the vanes, x is the distance downstream of the blade throat, and $\delta$ and $\delta^*$ are the boundary layer thickness and displacement thickness. The latter represents the blockage of the boundary layer. The pressure changes are small so that the density of the flow is constant at ambient conditions. In the embodiment where the thickness of one boundary layer of exit blockage, where fractional flow blockage at the throat ($B_t$) is considered negligible, such that $$B_t=0 \tag{14}$$

and where the radius of the exit $r_e$ and radius of the throat $r_t$ are, $$r_t=122 \text{ mm}, r_e=163 \text{ mm} \tag{15}$$

the total exit fractional flow blockage $B_e$ is, $$B_e=0.11 \tag{16}$$

Throat angle $\beta_t$ is chosen by solving for the resultant vector of the component flow vectors as they are predicted or known to be.

It is known that the calculation of the prime angle—the vector result for the tangential velocity as compared to the radial velocity—promotes an angle between 40.0 and 50.0 degrees or preferably 45.0 and 50.0 degrees. The mid-point between 45.0 and 50.0 degrees presents a base angle of 48.5 degrees. With the component flow vectors including the tangential flow velocity vector ($\omega_\theta$) and the radial flow velocity vector ($\omega_r$), throat angle 714 may be defined by the equation $$\beta_t=\tan^{-1}\omega_\theta/\omega_r=48.5° \tag{17}$$

Exit Angle $\beta_e$

Figure 8:
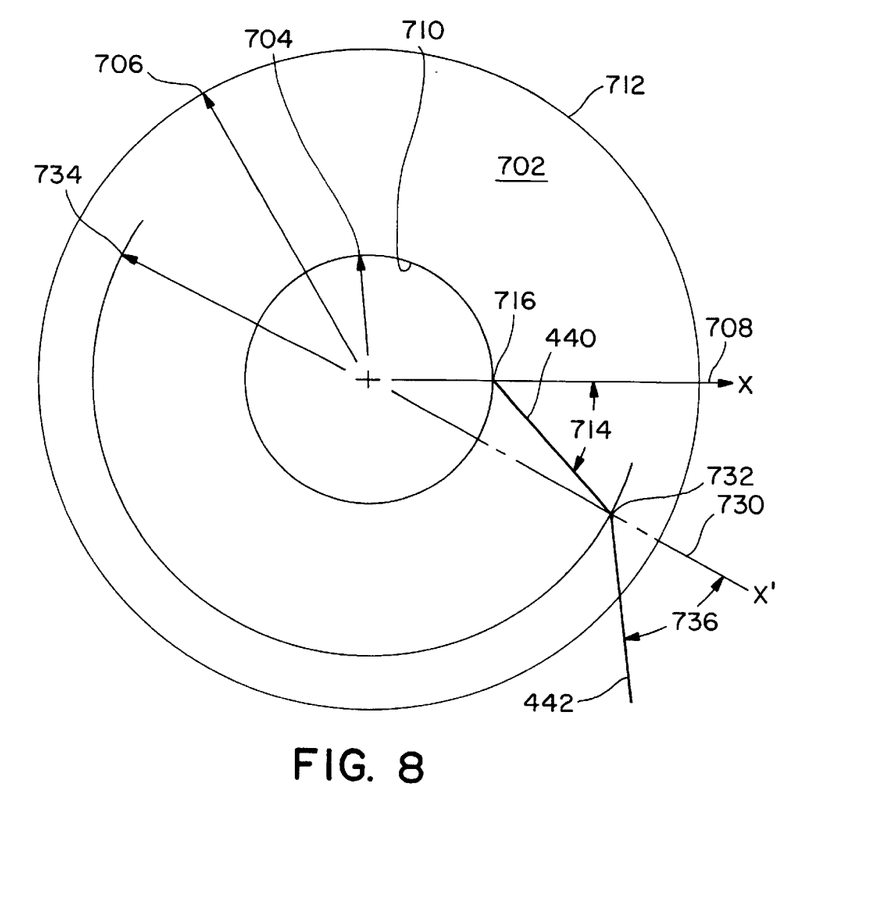
FIG. 8 illustrates the results of developing camber line 442 onto ring 702.

FIG. 8 illustrates the results of developing camber line 442 onto ring 702. For FIG. 8, ring 702 further is identified by datum 730. Where datum 708 may be an X-axis for ease of discussion, datum 730 may be thought of as an X'-axis for ease of discussion.

Camber line 442 is defined from a point that is adjacent to point 732. Point 732 is the intersection of datum 730 and ring radius datum 734. Camber line 442 further is defined by extending camber line 442 in an angular direction that is measured from radius datum 734 as exit angle 736 ($\beta_e$)

Since camber line 442 is designed to affect the exit flow of the air traveling through vent 360 (FIG. 4), radius datum 734 preferably resides at a location that is beyond fifty percent of the length between point 716 and the location where camber line 440 intersects ring exterior 712 of disc 702 (FIG. 8). Preferably, point 732 measures two-thirds of the length between point 716 and the location where camber line 440 intersects ring exterior 712. Practical casting issues may make it difficult to define camber line 442 exactly from point 732 or to extend to ring exterior 712.

The following discussion establishes that exit angle 736 (or $\beta_e$) may range from 40.0 and 60.0 degrees, but preferably is in excess of throat angle 174 ($\beta_t$).

The efficiency of vent exit 420 as well as the dispersion rate of vent 360 are a function of exit angle $\beta_e$. Thus, once throat angle 714 is known, it is important to evaluate setting the initial exit angle $\beta_e$ to fifty degrees.

Exit angle 736, $\beta_e$, may be found from equation (18), $$(A_e/A_t)_{effective} = r_e(1-B_e) \cos \beta_e / r_t(1-B_t) \cos \beta_t \tag{18}$$

therefore in this example, $$\beta_e = 56.2° \tag{19}$$

This result corresponds to the range of angles that result in maximum polytropic efficiency. In fact, in the absence of a requirement as to an angle for inlet angle 714 ($\beta_t$), one could start with a particular polytropic efficiency angle of the exit and calculate for $\beta_t$.

Short Vane 520

With the inlet angle 714 ($\beta_t$) and exit angle 736 ($\beta_e$) set, vanes 106 of FIG. 2 could be formed to give a completed rotor 100. However, by taking every other vane and pulling it away from the air inlet, the inlet throat area is increased. Even though some heat transferring surface area is lost, the increase in inlet throat area provides accounts for the growth of boundary layers about the perimeter of each vane. In other words, pulling back every other vane from the air inlet removes one set of air boundary layers from the air inlet. This can be seen by throats 322, 324, and 326 in FIG. 4.

Thus, alternate vanes are shorter and begin downstream of the leading edge of the longer vane as shown in FIG. 4. This practice allows for less incident losses at the inlet, smoother acceleration to the throat and allows the reattachment of any flow separation bubble on the trailing side of the long vane. While no flow separation is expected, many designs with less attack angle, including zero, on the inlet will form flow separation bubbles and turbulence which will appear to reduce the actual opening size of the inlet and result in reduced airflow. Preferably, short vanes 340 of FIG. 4 are pulled back so that the nose of each short vane 340 remains within tapered section 310.

Preimpeller Angle $\beta_{i\omega}$

Recall from FIG. 7 that throat angle 714 (the angle of attack or $\beta_t$) of camber line 440 may range from 45.0 and 50.0 degrees, but preferably is 48.5 degrees. A throat angle 714 of 48.5 degrees is good for seventy-five to one hundred miles per hour. Preimpeller angle ($\beta_{i\omega}$) is designed to affect efficiency at speeds that are less than those affected by throat angle 714. The formation of a preimpeller requires that the nose of camber line 440 be reflexed back to an angle that is greater than throat angle 714 so as to give a higher angle of attack.

Figure 9:
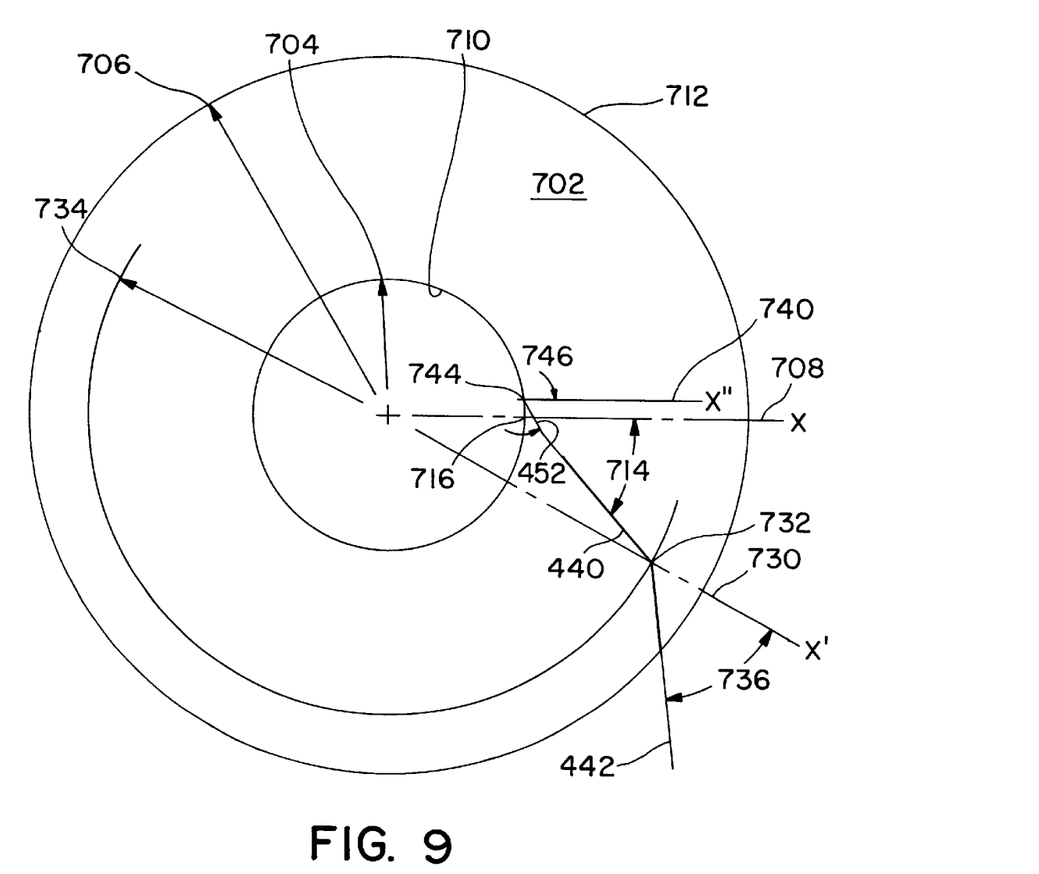
FIG. 9 illustrates the results of developing camber line 452 of FIG. 6 onto ring 702.

FIG. 9 illustrates the results of developing camber line 452 of FIG. 6 onto ring 702. For FIG. 9, ring 702 further is identified by datum 740. Where datum 708 may be an X-axis and datum 730 may be an X'-axis, datum 740 may be thought of as an X"-axis for ease of discussion. Datum 740 preferably is parallel to datum 708.

Camber line 452 is defined from a point that is adjacent to point 744. Point 744 is the intersection of datum 740 and ring interior 710. Camber line 452 further is defined by extending camber line 452 in an angular direction that is measured from datum 740 as preimpeller angle 746 ($\beta_{i\omega}$). Camber line 452 is extended at preimpeller angle 746 ($\beta_{i\omega}$) until camber line 452 intersects camber line 440.

Determining point 744 is a function of preimpeller angle 746 ($\beta_{i\omega}$) and the length of camber line 452. Once the length of camber line 452 and preimpeller angle 746 ($\beta_{i\omega}$) are known, point 744 can be determined. Determining preimpeller angle 746 is set out below. In general, preimpeller angle 746 needs to be greater than inlet angle 714. The length of camber line 452 preferably resides within tapered section 310 (FIG. 4), such as prior to or at the air inlet throat. In one embodiment, the length of camber line 452 is one-half the width of tapered section 310.

Since the pressure at the outlet and the inlet or preimpeller is the same, ambient pressure, we can calculate the inlet angle using the same method and then compare it to the calculated resultant vector of the flow velocity components. With $$(A_{t'}/A_i)_{effective} = (A_{t'}/A_e)_{effective} \tag{20}$$

we get, $$(A_{t'}/A_e)_{effective} = r_{t'}(1-B_{t'}) \cos \beta_{t'} / r_i(1-B_i) \cos \beta_i \tag{21}$$

with one change in reference, that is that the flow blockage component has changed to represent the condition downstream of front of the shorter vane where the vent is narrowest. The parameters that change are, the radius where this narrowest condition exists at the throat $r_{t'}$ is, $$r_{t'} = 131 \text{ mm} \tag{22}$$

and the nominal vane thickness at the throat represents a fractional flow blockage $B_{t'}$ for this calculation expressed as, $$B_{t'} = 0.409 \tag{23}$$

Because the flow accelerates to the throat smoothly in this design, the boundary layer thickness is laminar and the blockage due to the boundary layer at the inlet $B_i$ is negligible, therefore, $$B_i = 0 \tag{24}$$

and where the radius of the inlet $r_i$ in this example is, $$r_i = 116 \text{ mm} \tag{25}$$

Solving for the inlet angle $B_t$, $$\beta_i = 63.8° \tag{26}$$

The inlet or preimpeller angle $\beta_{i\omega}$ determined by testing and calculating the resultant vector of the flow velocity components $\omega_\theta$ and $\omega_r$ for a lower speed is comparable at, $$\beta_{i\omega} = 62.5° \tag{27}$$

These two numbers closely agree, thus validating the design methodology.

In sum, the preimpeller is accomplished by taking the basic calculated attack angle of the leading edge for the expected conditions at the maximum flow end of the operating range and modifying this calculated attack angle. The calculated attack angle is modified by the addition of a pre-body airfoil shape termed a preimpeller, where the preimpeller is at a lower angle of attack. The lower angle of attack improves flow at low- and mid-range rotor angular velocities and lower flow rates.

The leading side of the resultant air foil shape will accelerate the air stream slightly at higher velocities in this concave region. The trailing side of this leading edge of the long vane has a resultant convex shape that prevents separation bubbles formation at all rotor velocities in the operating range and thus improves efficiency over the operating range. Also, since the trailing side of the longer vane is only convex at the entry, the formation of separation bubbles is prevented near the middle to back portion of the vent. This exit region of the vane preferably is gradually tapered to increase the vent cross section more than occurs by the radial projection according to turbo machinery design.

The exemplary embodiments described herein are provided merely to illustrate the principles of the invention and should not be construed as limiting the scope of the subject matter of the terms of the claimed invention. The principles of the invention may be applied toward a wide range of systems to achieve the advantages described herein and to achieve other advantages or to satisfy other objectives, as well.

What is claimed is:

1. A unidirectional ventilated brake rotor, comprising:

a first disc defining a center, an interior radius, and a first datum, wherein the first datum extends from the center of the first disc to a point that intersects the interior radius, said first disc having a ring interior and a ring exterior; and a second disc, the first disc is tapered to accelerate air flow through a plurality of vents having an inlet and an exit, each vent defined by an adjacent pair of airfoil shaped vanes each having a single elongated body where each vane of each pair of air foil shaped vanes has a different shape from one another, the single elongated body having a first curved edge and a second curved edge, the first curved edge and second curved edge are opposing elongated sides of the elongated body, wherein the second curved edge of one of the airfoil shaped vanes of the pair of airfoil shaped vanes has a shape that is convex and concave and the first curved edge of each of the vanes of the pair of airfoil shaped vanes has a shape that is convex, the elongated body having a plurality of portions wherein the first curved edge and the second curved edge are not equidistant for a complete length of the elongated body, the vanes of the pair of airfoil shaped vanes being distributed around the first disc and disposed below the second disc, wherein the taper of the first disc is from points on the interior radius for a distance which at least partially overlies the vanes, wherein each vane is defined by at least one camber and one of the vanes of each pair of vanes has a nose portion angled toward a direction of forward rotation at said ring interior of the first disc and the other one of the vanes has a nose adjacent to said nose portion of the one of the vanes that is angled at a lesser angle toward the direction of forward rotation at said ring interior of the first disc than said nose portion of the one of the vanes, said one of the vanes has an end opposing its nose and the other one of the vanes has another end opposing the end adjacent to said nose portion of the one of the vanes that are angled opposing the direction of forward rotation at said ring exterior of the first disc, said nose of said one of the vanes tapered at an angle oppositely than the end opposing said nose of said one of the vanes, wherein each of the vanes of each pair of vanes has an exit surface that is angled toward a direction opposing forward rotation, wherein the at least one camber is parallel to a first curve, wherein the first curve is tangent to a point that is adjacent to a leading end of a first camber line and also a point that is adjacent to a trailing end of a second camber line, wherein a trailing end of the first camber line intersects a leading end of the second camber line, wherein the first camber line is defined from a point that is adjacent to the intersection of the first datum and the interior radius, and wherein the first camber line extends at a throat angle from the first datum.

2. The rotor of claim 1, wherein the leading end of the first camber line is the point that is adjacent to the point at which the first datum crosses the interior radius, and wherein the trailing end of the first camber line is the point that is adjacent to an intersection of the leading end of the second camber line and a second datum.

3. The rotor of claim 2, wherein a radius of the second datum has a length at a location that is beyond fifty percent of a length between the leading end of the first camber line and an exterior of the first disc.

4. The rotor of claim 2, wherein a radius of the second datum has a length that is two-thirds a length between the leading end of the first camber line and an exterior of the first disc.

5. The rotor of claim 1, wherein the relationship of the center of the first disc and the intersection of the first camber line and the second camber line defines a second datum, where the second camber line and the second datum define an exit angle, and wherein the exit angle is between forty and sixty degrees.

6. The rotor of claim 5, wherein the exit angle is greater than the throat angle.

7. The rotor of claim 6, wherein the throat angle is between forty and fifty degrees.

8. The rotor of claim 7, wherein the throat angle is 48.5 degrees and the exit angle is less than 57.0 degrees.

9. The rotor of claim 1, wherein each adjacent pair of vanes includes a long vane and a short vane, wherein each long vane further is defined by an additional second camber, wherein the additional second camber is parallel to a second curve, wherein the second curve is tangent to the first curve and to a point defined by the intersection of a third datum and a third camber line, wherein the third datum is parallel to and disposed above the first datum, and wherein the third camber line extends at a preimpeller angle from the third datum.

10. The rotor of claim 9, wherein the preimpeller angle is greater than the throat angle.

11. The rotor of claim 10, wherein the throat angle is between forty and fifty degrees.

12. The rotor of claim 11, wherein the throat angle is 48.5 degrees and the preimpeller angle is less than 62.5 degrees.

13. A unidirectional ventilated brake rotor adapted for an automobile, comprising:

a first disc defining a center, an interior radius, and a first datum, the first disc is tapered to accelerate air flow through a plurality of vents, wherein the first datum extends from the center of the first disc to a point that intersects the interior radius, said first disc having a ring interior and a ring exterior, and a second disc, each vent defined by an adjacent pair of air foil shaped vanes where each vane of each pair of air foil shaped vanes has a different shape from one another, each vane having a single elongated body, a first curved edge and a second curved edge, the first curved edge and second curved edge are opposing elongated sides of the elongated body, wherein the second curved edge of one of the airfoil shaped vanes of each of pair of airfoil shaped vanes has a shape that is convex and concave and the first curved edge of each of the vanes of the pair of airfoil shaped vanes has a shape that is convex, the elongated body having a plurality of portions wherein the first curved edge and the second curved edge are not equidistant, the vanes of the pair of airfoil shaped vanes being distributed around the first disc and disposed below the second disc, wherein each vane is defined by at least one camber and one of the vanes of each pair of vanes has a nose portion angled toward a direction of forward rotation at said ring interior of the first disc and the other one of the vanes has a nose adjacent to said nose portion of said one of the vanes that is angled at a lesser angle toward the direction of forward rotation at said ring interior of the first disc, said one of the vanes has an end opposing its nose and the other one of the vanes has another end opposing the end adjacent to the nose portion of said one of the vanes that are angled opposing the direction of forward rotation at said ring exterior of the first disc, said nose of said one of the vanes tapered at an angle oppositely than the end opposing said nose of said one of the vanes, wherein each of the vanes of each pair of vanes has an exit surface that is angled toward a direction opposing forward rotation, wherein the at least one camber is parallel to a first curve, wherein the first curve is tangent to a point that is adjacent to a leading end of a first camber line and also a point that is adjacent to a trailing end of a second camber line, wherein a trailing end of the first camber line intersects a leading end of the second camber line, wherein the first camber line is defined from a point that is adjacent to the intersection of the first datum and the interior radius, and wherein the first camber line extends at a throat angle from the first datum.

14. The unidirectional ventilated brake rotor adapted for an automobile of claim 13, wherein the leading end of the first camber line is the point that is adjacent to the point at which the first datum crosses the interior radius, and wherein the trailing end of the first camber line is the point that is adjacent to an intersection of the leading end of the second camber line and a second datum.

15. The unidirectional ventilated brake rotor adapted for an automobile of claim 14, wherein a radius of the second datum has a length at a location that is beyond fifty percent of a length between the leading end of the first camber line and an exterior of the first disc.

16. The unidirectional ventilated brake rotor adapted for an automobile of claim 14, wherein a radius of the second datum has a length that is two-thirds the length between the leading end of the first camber line and an exterior of the first disc.

17. The unidirectional ventilated brake rotor adapted for an automobile of claim 13, wherein each adjacent pair of vanes includes a long vane and a short vane, wherein each long vane further is defined by an additional second camber, wherein the additional second camber is parallel to a second curve, wherein the second curve is tangent to the first curve and also a point defined by the intersection of a third datum and a third camber line, wherein the third datum is parallel to and disposed above the first datum, and wherein the third camber line extends at a preimpeller angle from the third datum.

18. The unidirectional ventilated brake rotor adapted for an automobile of claim 17, wherein the preimpeller angle is greater than the throat angle.

19. The unidirectional ventilated brake rotor adapted for an automobile of claim 18, wherein the throat angle is between forty and fifty degrees.

20. The unidirectional ventilated brake rotor adapted for an automobile of claim 19, wherein the throat angle is 48.5 degrees and the preimpeller angle is less than 62.5 degrees.

* * * * *